(12) United States Patent
Yano (10) Patent No.: US 11,718,185 B2
(45) Date of Patent: Aug. 8, 2023

(54) VEHICLE CONTROL APPARATUS

(71) Applicant: SUBARU CORPORATION, Tokyo (JP)

(72) Inventor: Takuya Yano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/563,574

(22) Filed: Dec. 28, 2021

(65) Prior Publication Data

US 2022/0212546 A1 Jul. 7, 2022

(30) Foreign Application Priority Data

Jan. 5, 2021 (JP) ................................. 2021-000383

(51) Int. Cl.
*H02P 7/00* (2016.01)
*B60L 15/20* (2006.01)
*B60L 3/00* (2019.01)
*B60L 50/51* (2019.01)
*B60L 15/00* (2006.01)

(52) U.S. Cl.
CPC ............... *B60L 15/20* (2013.01); *B60L 3/003* (2013.01); *B60L 3/0061* (2013.01); *B60L 3/0084* (2013.01); *B60L 15/007* (2013.01); *B60L 50/51* (2019.02); *B60L 2240/421* (2013.01); *B60L 2240/423* (2013.01); *B60L 2240/642* (2013.01); *B60L 2250/26* (2013.01)

(58) Field of Classification Search
CPC .......... B60L 15/20; B60L 50/51; B60L 3/003; B60L 3/0061; B60L 3/0084; B60L 15/007; B60L 2240/421; B60L 2240/423; B60L 2240/642; B60L 2250/26; H02P 29/024; H02P 6/08
See application file for complete search history.

(56) References Cited

U.S. PATENT DOCUMENTS

2019/0393824 A1   12/2019   Osugi

FOREIGN PATENT DOCUMENTS

| JP | 09-70195 A | 3/1997 | |
| JP | 2007-325417 A | 12/2007 | |
| JP | 2017-220971 A | 12/2017 | |
| JP | 2019130967 A | * 8/2019 | ............. B60K 6/387 |
| JP | 2020-005373 A | 1/2020 | |

* cited by examiner

*Primary Examiner* — Karen Masih
(74) *Attorney, Agent, or Firm* — McDermott Will & Emery LLP (57) ABSTRACT

A vehicle control apparatus includes an inverter, a torque setting unit that sets a first torque command value of a traveling motor based on an accelerator operation amount, a torque correction unit that corrects the first torque command value to a second torque command value by performing feedback of the result of control of the traveling motor to the first torque command value, an inverter control unit that generates a drive signal of switching elements based on the second torque command value and a carrier signal, and a motor lock determination unit. When the traveling motor is determined to be in the motor lock state by the motor lock determination unit, the torque correction unit sets a feedback gain to be smaller than a threshold gain, and the inverter control unit sets the frequency of the carrier signal to be lower than a threshold frequency.

17 Claims, 10 Drawing Sheets

VEHICLE CONTROL APPARATUS

CROSS-REFERENCE TO RELATED APPLICATIONS

The present application claims priority from Japanese Patent Application No. 2021-000383 filed on Jan. 5, 2021, the entire contents of which are hereby incorporated by reference.

BACKGROUND

The technology relates to a vehicle control apparatus that controls a traveling motor serving as a power source of a drive system.

Vehicles such as electric vehicles and hybrid vehicles include traveling motors serving as power sources of drive systems. The traveling motor receives electric power at a stator coil from a lithium-ion battery via an inverter. Reference is made to Japanese Unexamined Patent Application Publication (JP-A) Nos. H9-70195, 2020-5373, 2007-325417, and 2017-220971.

SUMMARY

An aspect of the technology provides a vehicle control apparatus to be applied to a vehicle. The vehicle control apparatus is configured to perform control of a traveling motor of the vehicle that serves as a power source of a drive system of the vehicle. The vehicle control apparatus includes an inverter, a torque setting unit, a torque correction unit, an inverter control unit, and a motor lock determination unit. The inverter includes a plurality of switching elements. The inverter is configured to supply electric power to the traveling motor through the switching elements. The torque setting unit is configured to set a first torque command value of the traveling motor on the basis of an operation amount of an accelerator of the vehicle. The torque correction unit is configured to correct the first torque command value to a second torque command value to be used to suppress vibration of the drive system by performing feedback of the result of the control of the traveling motor to the first torque command value. The inverter control unit is configured to generate a drive signal for the switching elements on the basis of the second torque command value and a carrier signal. The motor lock determination unit is configured to determine whether the traveling motor is in a motor lock state in which the traveling motor operates within a lock range. In a case where the traveling motor is determined to be in the motor lock state, the torque correction unit is configured to set a feedback gain to be smaller than a threshold gain at the time of correcting the first torque command value to the second torque command value. In the case where the traveling motor is determined to be in the motor lock state, the inverter control unit is configured to set a frequency of the carrier signal to be lower than a threshold frequency at the time of generating the drive signal.

An aspect of the technology provides a vehicle control apparatus to be applied to a vehicle. The vehicle control apparatus is configured to perform control of a traveling motor of the vehicle that serves as a power source of a drive system of the vehicle. The vehicle control apparatus includes an inverter and circuitry. The inverter includes a plurality of switching elements. The inverter is configured to supply electric power to the traveling motor through the switching elements. The circuitry is configured to set a first torque command value of the traveling motor on the basis of an operation amount of an accelerator of the vehicle. The circuitry is configured to correct the first torque command value to a second torque command value to be used to suppress vibration of the drive system by performing feedback of the result of the control of the traveling motor to the first torque command value. The circuitry is generate a drive signal for the switching elements on the basis of the second torque command value and a carrier signal. The circuitry is determine whether the traveling motor is in a motor lock state in which the traveling motor operates within a lock range. Upon determining that the traveling motor is in the motor lock state, the circuitry is configured to set a feedback gain to be smaller than a threshold gain at the time of correcting the first torque command value to the second torque command value. Upon determining that the traveling motor is in the motor lock state, the circuitry is configured to set a frequency of the carrier signal to be lower than a threshold frequency at the time of generating the drive signal.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

While the traveling motor is in a motor lock state in which the traveling motor operates at a high-torque and in a low-rotation lock range, electric current flowing to a stator coil can be locally increased. As the temperature of the traveling motor locally increases in the motor lock state, it is necessary to urge the driver to perform an accelerator operation or another driving operation for cancelling the motor lock state.

It is desirable to provide a vehicle control apparatus that urges the driver to perform an accelerator operation or another driving operation while the traveling motor is in the motor lock state.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

Exemplary Vehicle Configuration

Figure 1:
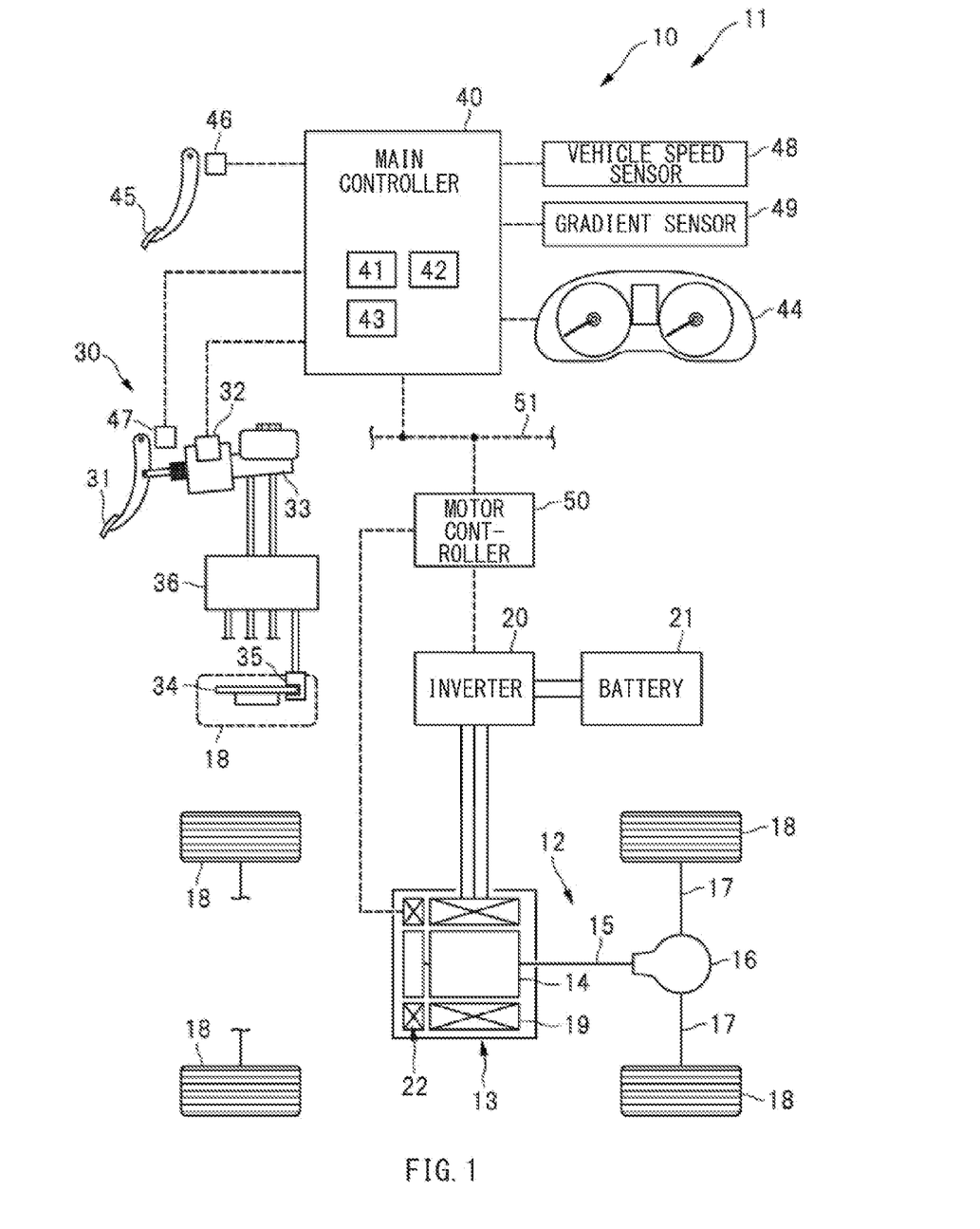
FIG. 1 is a block diagram illustrating an exemplary configuration of a vehicle including a vehicle control apparatus according to one example embodiment of the technology.

FIG. 1 illustrates an exemplary configuration of a vehicle 11 including a vehicle control apparatus 10 according to an example embodiment of the technology. As illustrated in FIG. 1, the vehicle 11 may include a drive system 12. The drive system 12 may include a traveling motor 13 serving as a power source. The traveling motor 13 illustrated in FIG. 1 may be a three-phase AC motor, such as a synchronous motor or an induction motor. The traveling motor 13 may include a rotor 14 to which wheels 18 are coupled via a motor output shaft 15, a differential mechanism 16, and a wheel drive shaft 17. The traveling motor 13 may further include a stator 19 to which an inverter 20 is coupled. To the inverter 20, a battery 21 may be coupled. The battery 21 may be a lithium-ion battery, for example. The traveling motor 13 may further include a rotation sensor 22. For example, the rotation sensor 22 may be a resolver that detects the rotation speed on the basis of the rotation angle of the rotor 14.

The vehicle 11 may further include an electric hydraulic brake system 30 that applies the brakes to the wheels 18. To the electric hydraulic brake system 30, a brake pedal 31 may be coupled. The electric hydraulic brake system 30 may further include a master cylinder 33 provided with an electric motor 32. The electric hydraulic brake system 30 may further include a caliper 35 and a hydraulic pressure circuit 36. The caliper 35 may apply the brake to a disc rotor 34 of each wheel 18. The hydraulic pressure circuit 36 may control the hydraulic brake pressure to be supplied to each caliper 35. When the master cylinder 33 is thrusted by depressing on the brake pedal 31 or by the electric motor 32, the hydraulic brake pressure may be transferred from the master cylinder 33 to the caliper 35 via the hydraulic pressure circuit 36, so that the caliper 35 may apply the brake to the disc rotor 34 of each wheel 18.

Main Controller

As illustrated in FIG. 1, the vehicle control apparatus 10 may include a main controller 40. The main controller 40 may be a microcomputer, for example. The main controller 40 may include a target torque setting unit 41, a brake control unit 42, and a meter control unit 43. The target torque setting unit 41 sets a target torque command value Tm1 of the traveling motor 13 on the basis of an accelerator operation performed by the driver, for example. In one embodiment, the target torque setting unit 41 may serve as a "torque setting unit". In one embodiment, the target torque command value Tm1 may serve as a "first torque command value". The brake control unit 42 may control the electric hydraulic brake system 30 depending on traveling conditions, for example. The meter control unit 43 may control information displayed on a meter panel 44 depending on traveling conditions, for example. To the main controller 40, an accelerator sensor 46, a brake sensor 47, a vehicle speed sensor 48, and a gradient sensor 49 may be coupled. The accelerator sensor 46 may detect the amount of depression of the accelerator pedal 45 (hereinafter referred to as an accelerator operation amount Acc). The brake sensor 47 may detect the amount of depression of the brake pedal 31. The vehicle speed sensor 48 may detect the traveling speed of the vehicle 11. The gradient sensor 49 may detect the gradient of a road surface. The gradient sensor 49 may be an acceleration sensor, for example.

Figure 2:
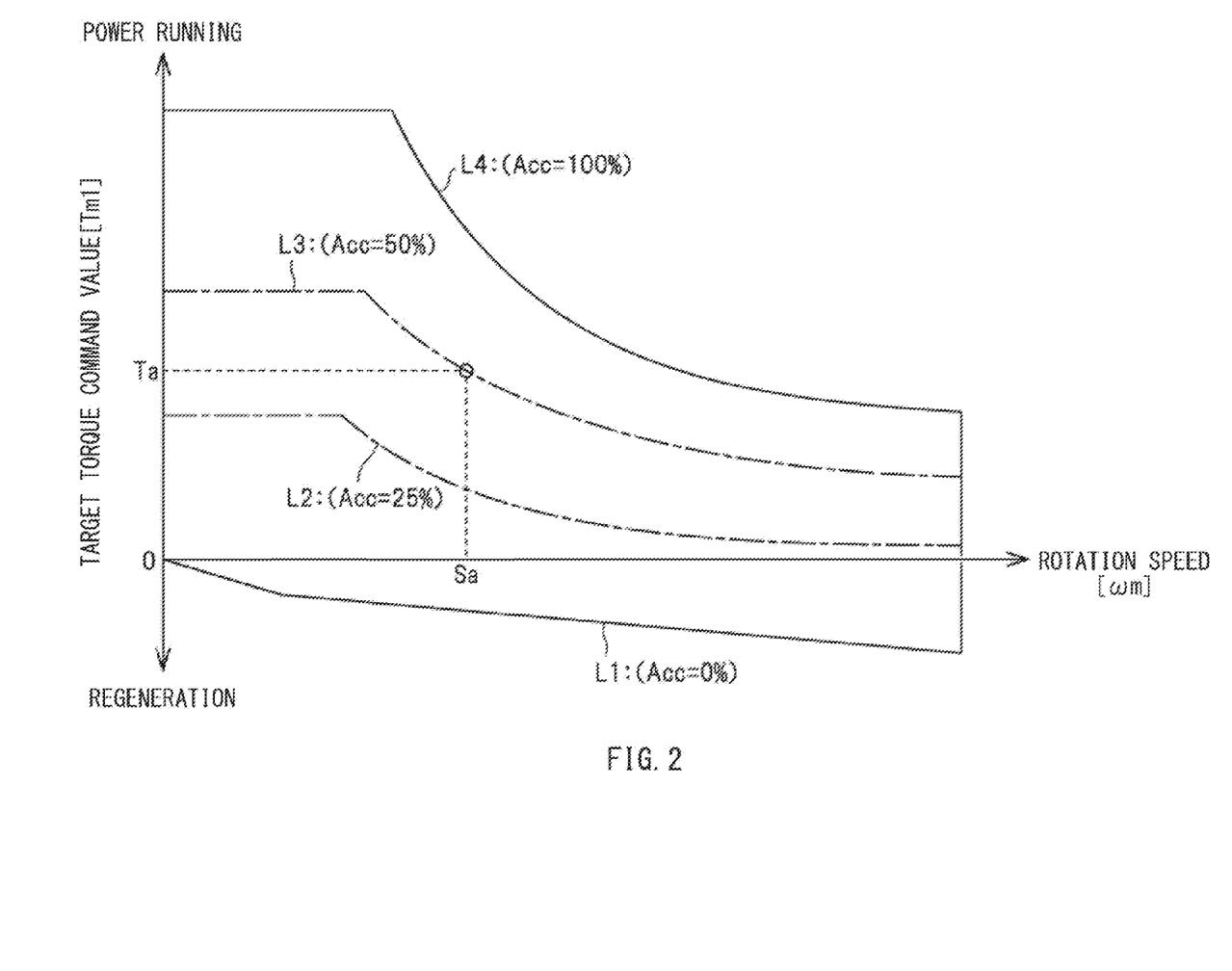
FIG. 2 is a diagram illustrating an exemplary torque map used to set a target torque command value.

FIG. 2 illustrates an exemplary torque map used to set the target torque command value Tm1. As illustrated in FIG. 2, the torque map may have characteristic lines L1 to L4 indicating the target torque command values Tm1 for the respective accelerator operation amounts Acc. That is, in a case where the accelerator operation amount Acc is 0%, the target torque command value Tm1 may be set on the basis of the characteristic line L1, and in a case where the accelerator operation amount Acc is 25%, the target torque command value Tm1 may be set on the basis of the characteristic line L2. Likewise, in a case where the accelerator operation amount Acc is 50%, the target torque command value Tm1 may be set on the basis of the characteristic line L3, and in a case where the accelerator operation amount Acc is 100%, the target torque command value Tm1 may be set on the basis of the characteristic line L4. For example, in a case where the accelerator operation amount Acc is 50% and where the rotation speed ωm of the rotor 14 is "Sa", the target torque command value Tm1 may be set to "Ta". Although the torque map illustrated in FIG. 2 has the four characteristic lines L1 to L4, this is a non-limiting example. Alternatively, the torque map may have five or more characteristic lines.

Motor Controller

Figure 3:
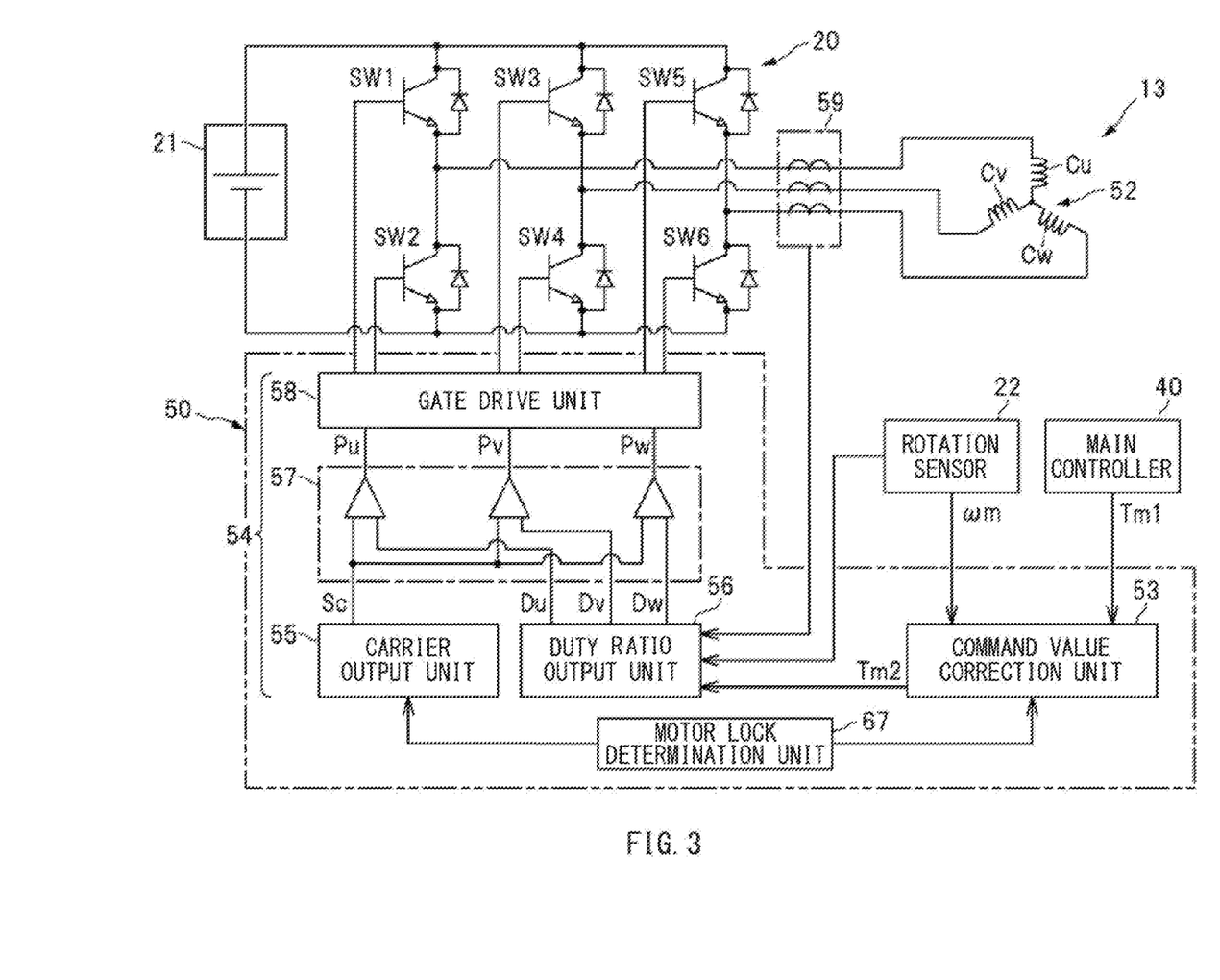
FIG. 3 is a block diagram illustrating an exemplary inverter and an exemplary motor controller according to one example embodiment of the technology.

As illustrated in FIG. 1, the vehicle control apparatus 10 may include a motor controller 50. The motor controller 50 may be a microcomputer, for example. The motor controller 50 may control the traveling motor 13 via the inverter 20. The motor controller 50 and the main controller 40 may be connected to each other via an in-vehicle network 51, such as a controller area network (CAN), in a mutually communicable manner. FIG. 3 illustrates examples of the inverter 20 and the motor controller 50.

As illustrated in FIG. 3, the inverter 20 may be a three-phase bridge circuit that includes a plurality of switching elements SW1 to SW6. The inverter 20 supplies electric power to the traveling motor 13. These switching elements SW1 to SW6 may be driven by pulse width modulation (PWM) control. DC power outputted from the battery 21 may be converted into AC power while passing through the switching elements SW1 to SW6. The AC power outputted from the inverter 20 may be supplied to a U-phase field coil Cu, a V-phase field coil Cv, and a W-phase field coil Cw of a stator coil 52 of the traveling motor 13. Supplying the AC power to the U-phase field coil Cu, the V-phase field coil Cv, and the W-phase field coil Cw causes the stator 19 to generate a rotating magnetic field, which rotates the rotor 14.

As illustrated in FIG. 3, the motor controller 50 may include a command value correction unit 53 and an inverter control unit 54. The command value correction unit 53 may correct the target torque command value Tm1 to a damping torque command value Tm2 to perform damping control (to be described later) for suppressing vibration of the drive system 12. In one embodiment, the command value correction unit 53 may serve as a "torque correction unit". In one embodiment, the damping torque command value Tm2 may serve as a "second torque command value". The inverter control unit 54 may include a carrier output unit 55, a duty ratio output unit 56, a pulse setting unit 57, and a gate drive unit 58. The carrier output unit 55 may output a carrier signal Sc having a predetermined frequency. The duty ratio output unit 56 may output command duty ratios Du, Dv, and Dw that are set on the basis of the damping torque command value Tm2. The pulse setting unit 57 may compare the carrier signal Sc outputted from the carrier output unit 55 with the command duty ratios Du, Dv, and Dw outputted from the duty ratio output unit 56 to set pulse signals Pu, Pv, and Pw that are driving signals of the switching elements SW1 to SW6. On the basis of the pulse signals Pu, Pv, and Pw, the gate drive unit 58 may drive the switching elements SW1 to SW6. To set the command duty ratios Du, Dv, and Dw, the duty ratio output unit 56 may receive electric currents from the U-phase field coil Cu, the V-phase field coil Cv, and the W-phase field coil Cw in the current sensor 59, and the rotation angle of the rotor 14 from the rotation sensor 22.

Damping Control

Figure 4:
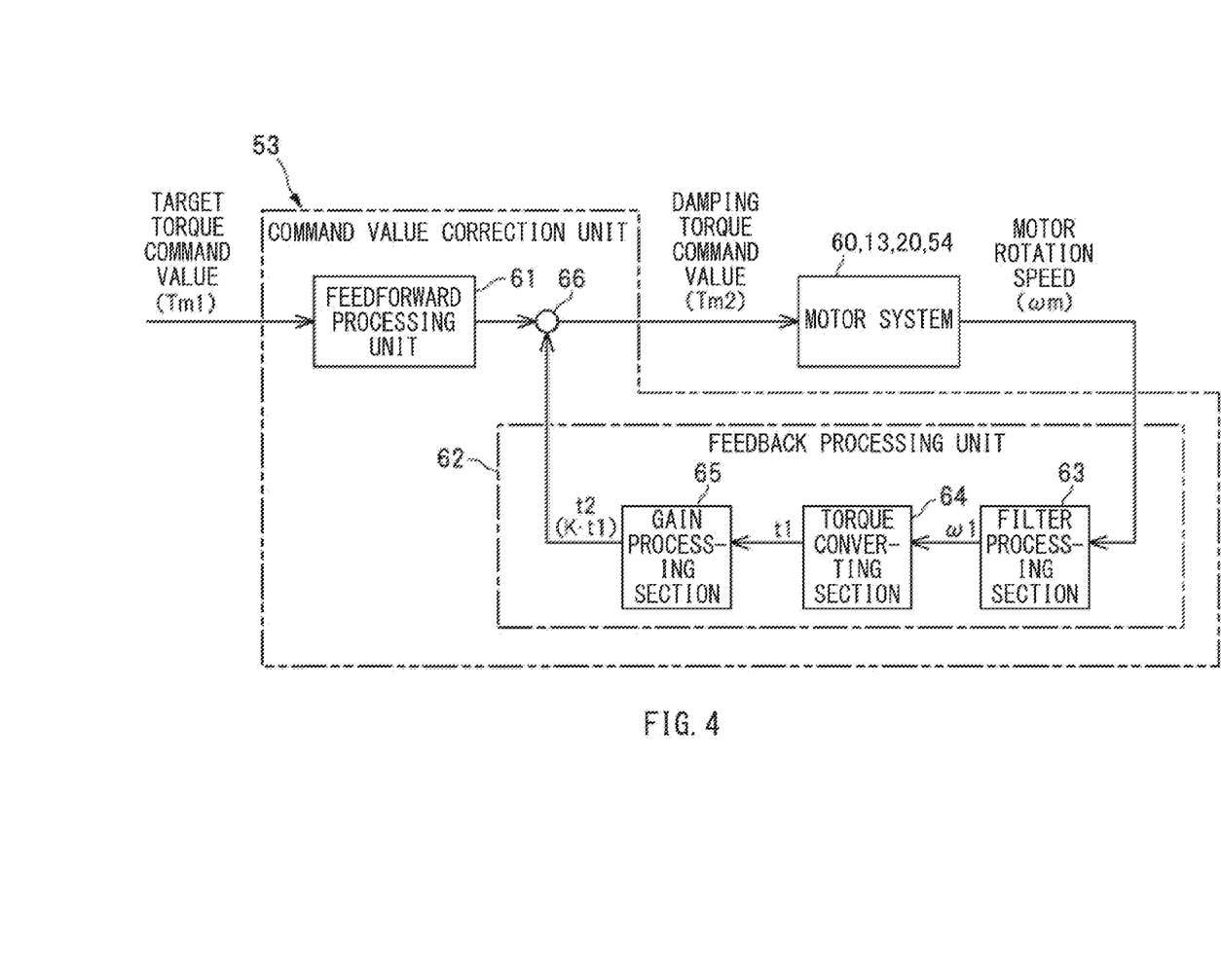
FIG. 4 is a diagram illustrating an exemplary configuration of a command value correction unit that executes damping control.

Damping control of the traveling motor 13 performed by the motor controller 50 will now be described. The damping control of the traveling motor 13 may be torque control of the traveling motor 13 for suppressing torsional vibration of the wheel drive shaft 17 of the drive system 12. FIG. 4 illustrates an exemplary configuration of the command value correction unit 53 that executes the damping control. A motor system 60 illustrated in FIG. 4 may be a control system including the inverter control unit 54, the inverter 20, and the traveling motor 13.

As illustrated in FIG. 4, the command value correction unit 53 of the motor controller 50 may include a feedforward processing unit 61 and a feedback processing unit 62 in order to execute the damping control of the traveling motor 13. The feedforward processing unit 61 may execute a feedforward process on the target torque command value Tm1 received from the main controller 40 to attenuate a resonant component of the wheel drive shaft 17. The feedback processing unit 62 may perform feedback of the rotation speed ωm of the rotor 14 acquired as the result of the control of the traveling motor 13 to the target torque command value Tm1 having been subjected to the feedforward process. The feedback processing unit 62 may thereby correct the target torque command value Tm1 to the damping torque command value Tm2 to cancel the vibration of the wheel drive shaft 17.

The feedback processing unit 62 may include a filter processing section 63, a torque converting section 64, and a gain processing section 65. The filter processing section 63 may perform a predetermined filtering process on the rotation speed ωm to extract a resonant component ω1 of the wheel drive shaft 17 from the rotation speed ωm. Thereafter, the torque converting section 64 may perform a predetermined conversion process on the resonant component ω1 of the rotation speed ωm to convert the resonant component ω1 of the rotation speed ωm into a resonant component t1 of a motor torque. Thereafter, the gain processing section 65 may multiply the resonant component t1 of the motor torque by a predetermined feedback gain K to calculate a torque correction value t2. The torque correction value t2 may be used to cancel vibration of the wheel drive shaft 17. Thereafter, a correction processing unit 66 in the command value correction unit 53 may correct the target torque command value Tm1 having been subjected to the feedforward process to the damping torque command value Tm2 using the torque correction value t2.

As described above, the traveling motor 13 may be controlled on the basis of the pulse signals Pu, Pv, and Pw generated on the basis of the damping torque command value Tm2 to cancel the vibration of the wheel drive shaft 17. This suppresses vibration of the drive system 12 generated while the vehicle 11 is traveling. As the feedback gain K takes a larger value, the function of the feedback process of attenuating the resonant component of the wheel drive shaft 17 of the drive system 12 to cancel the vibration of the wheel drive shaft 17 is more strengthened. This effectively suppresses the vibration of the drive system 12 but lowers the responsivity of the motor torque. As the feedback gain K takes a smaller value, the function of the feedback process is more weakened. This makes the drive system 12 more prone to vibration but enhances the responsivity of the motor torque while.

Motor Lock State

Figure 5:
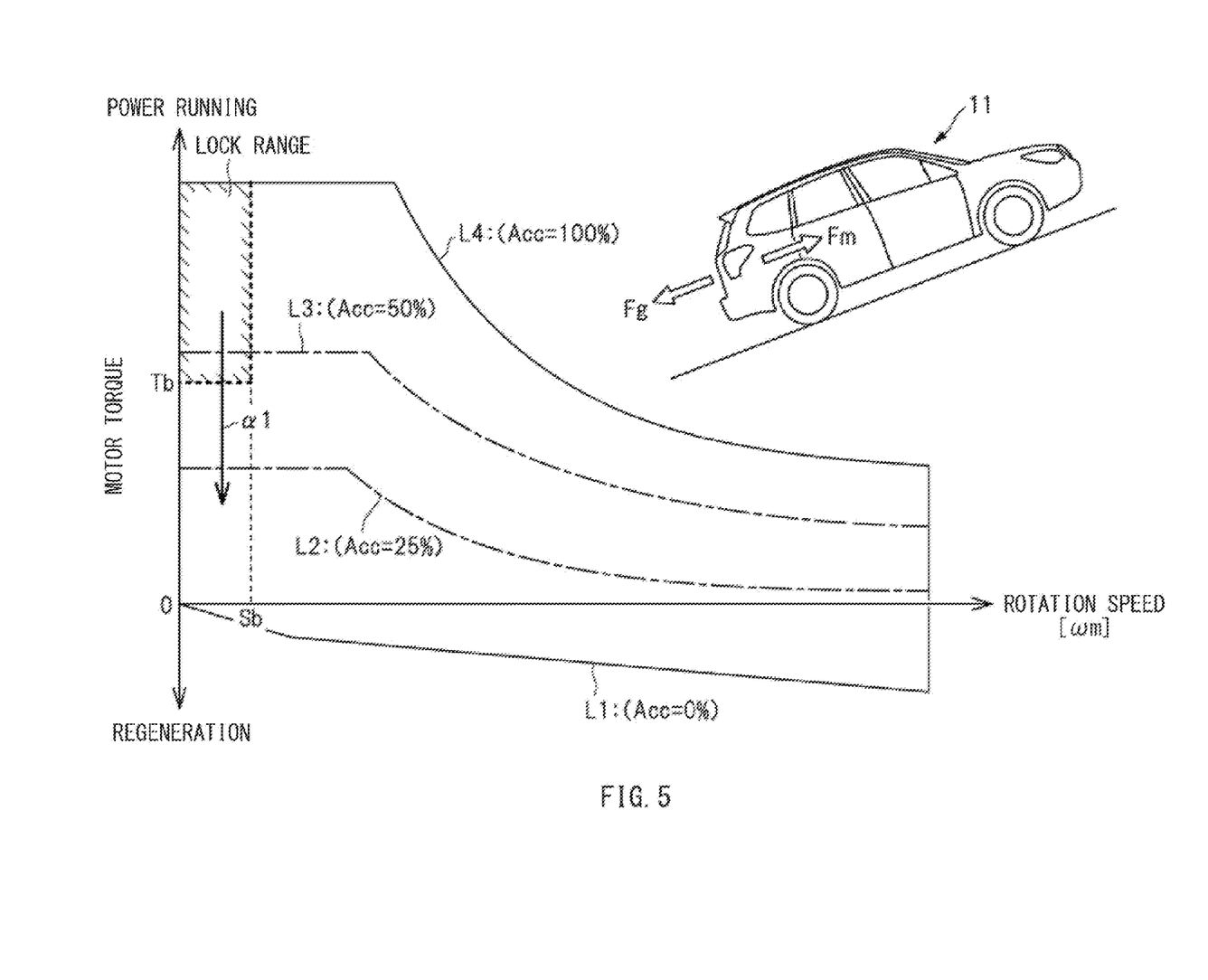
FIG. 5 is a diagram illustrating an exemplary lock range.

Described next is a motor lock state of the traveling motor 13. FIG. 5 illustrates an exemplary lock range. As illustrated in FIG. 5, the lock range may be a high-torque and low-rotation range in which the rotation speed ωm of the traveling motor 13 is less than a threshold rotation speed Sb and the motor torque of the traveling motor 13 is greater than a threshold torque Tb. While the traveling motor 13 is in the motor lock state and operating in the lock range, the electric current flowing into the stator coil 52 can be locally increased. For example, the electric current flowing into the U-phase field coil Cu, the V-phase field coil Cv, and the W-phase field coil Cw can be locally increased while the traveling motor 13 is in the motor lock range. This can locally increase the temperature of the stator coil 52.

To address the concern, the motor controller 50 includes a motor lock determination unit 67, as illustrated in FIG. 3. The motor lock determination unit 67 determines whether the traveling motor 13 is operating within the lock range or not, that is, whether the traveling motor 13 is in the motor lock state or not. The motor lock determination unit 67 may determine whether the traveling motor 13 is operating within the lock range on the basis of the motor torque and the rotation speed of the traveling motor 13. If it is determined that the traveling motor 13 has been in the motor lock state for a predetermined period of time, the command value correction unit 53 in the motor controller 50 actively reduces the damping torque command value Tm2 to protect the traveling motor 13 from being heated by an excessive electric current. This reduces the motor torque of the traveling motor 13. As a result, the traveling motor 13 is brought out of the lock range, as indicated by an arrow α1, to protect the traveling motor 13.

Meanwhile, the traveling motor 13 may be supposed to operate within the lock range when the driver adjusts the accelerator operation amount to stop the vehicle 11 on a climbing road surface. That is, in the lock range, a motor torque force Fm that moves the vehicle 11 forward and a gravitational force Fg that moves the vehicle 11 backward are balanced to stop the vehicle 11. In such a situation where the traveling motor 13 is determined to be in the motor lock state and where the motor torque is lowered while the vehicle 11 is stopped by the accelerator operation, the vehicle 11 can be moved backward against the intention of the driver. To address such a concern, if the traveling motor 13 is determined to be in the motor lock state, the vehicle control apparatus 10 according to the example embodiment actively vibrates the vehicle 11 by executing lock cancelling control to be described later, rather than immediately lowering the motor torque. That is, the vehicle control apparatus 10 generates vibration of the vehicle 11 to notify the driver of the vehicle 11 that the vehicle 11 is in the motor lock state, and urges the driver to perform an accelerator operation or a brake operation. The vehicle control apparatus 10 thereby cancels the motor lock state of the traveling motor 13.

Lock Cancelling Control

Figure 6:
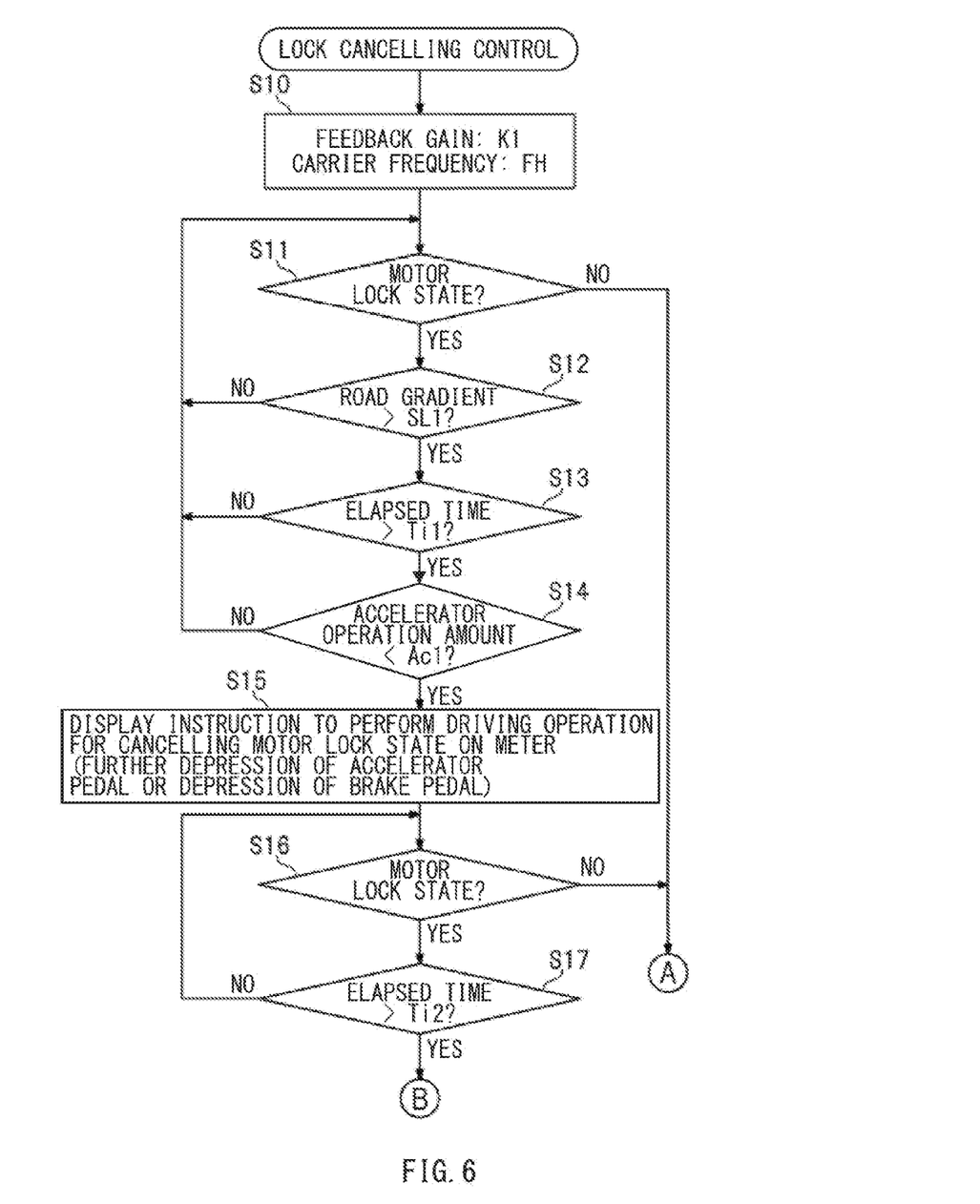
FIG. 6 is a flowchart of an exemplary procedure of lock cancelling control.
Figure 7:
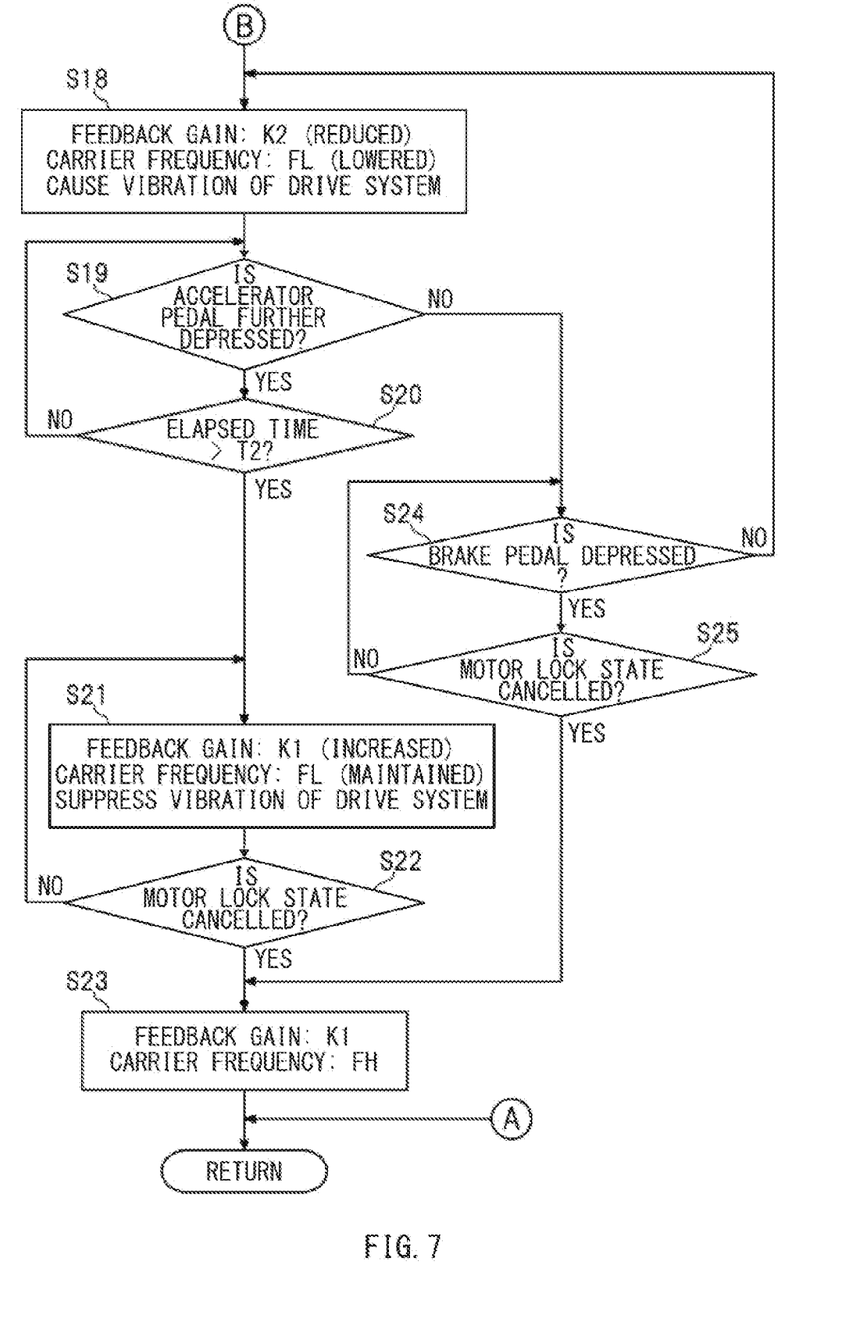
FIG. 7 is a flowchart of the exemplary procedure of the lock cancelling control.
Figure 8:
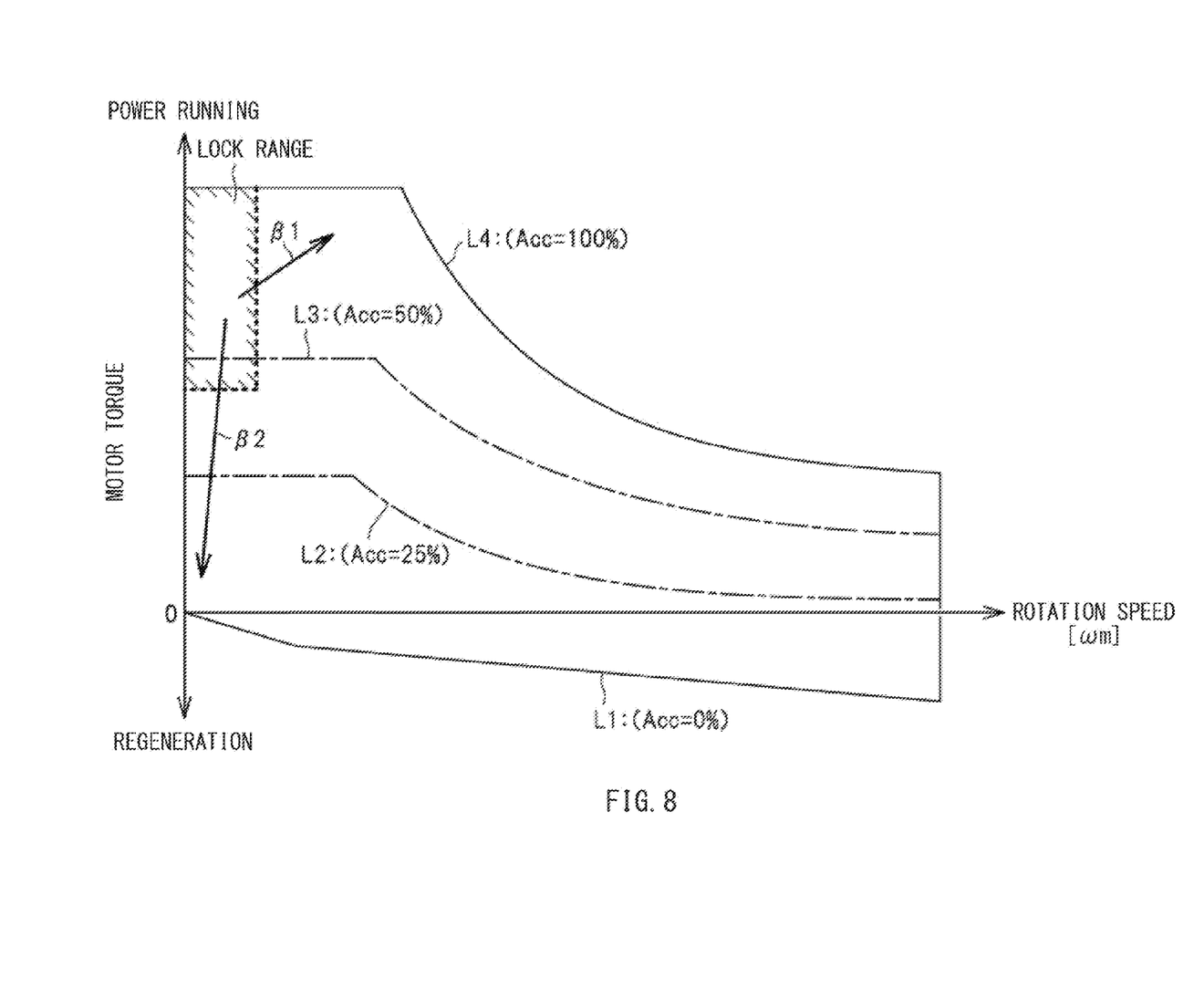
FIG. 8 is a diagram illustrating an exemplary transition of the operational state of a traveling motor.

The lock cancelling control performed by the vehicle control apparatus 10 will now be described. FIGS. 6 and 7 are flowcharts illustrating an exemplary procedure of the lock cancelling control. The flowcharts illustrated in FIGS. 6 and 7 are connected with each other at portions A and B. FIG. 8 illustrates an exemplary transition of the operational state of the traveling motor 13. In the flowing description, the frequency of the carrier signal Sc may be referred to as a carrier frequency.

As illustrated in FIG. 6, the feedback gain may be set to a predetermined feedback gain K1, and the carrier frequency may be set to a predetermined carrier frequency FH in Step S10. Thereafter, in Step S11, it may be determined whether the traveling motor 13 is in the motor lock state. If it is determined in Step S11 that the traveling motor 13 is in the motor lock state (Step S11: YES), the procedure may proceed to Step S12. In Step S12, it may be determined whether the road gradient is an upward gradient greater than a predetermined gradient SL1. If it is determined in Step S12 that the gradient of the road surface is the upward gradient greater than the predetermined gradient SL1 (Step S12: YES), the procedure may proceed to Step S13. In Step S13, it may be determined whether the traveling motor 13 has been in the motor lock state for longer than a predetermined period of time Ti1. If it is determined in Step S13 that the traveling motor 13 has been in the motor lock state for longer than the predetermined period of time Ti1 (Step S13: YES), the procedure may proceed to Step S14. In Step S14, it may be determined whether the amount of accelerator operation performed by the driver is less than a predetermined amount Ac1. If it is determined in Step S14 that the amount of accelerator operation is less than the predetermined amount Ac1 (Step S14: YES), that is, if the accelerator pedal 45 has a stamping margin, the procedure may proceed to Step S15. In Step S15, an instruction may be displayed on the meter panel 44 to urge the driver to perform an accelerator operation or a brake operation for cancelling the motor lock state.

That is, in a case where the traveling motor 13 has been in the motor lock state for longer than the predetermined period of time, where the road surface on which the vehicle 11 is traveling has the upward gradient, and where the accelerator pedal 45 has the stamping margin, it may be supposed that the vehicle 11 is stopped on a climbing road surface by the accelerator operation. In this case, the temperature of the stator coil 52 can excessively increase. To address such a concern, in Step S15, an instruction to further depress the accelerator pedal 45 or depress the brake pedal 31 may be displayed on the meter panel 44 to urge the driver to perform the accelerator operation or the brake operation for cancelling the motor lock state. When the driver further depresses the accelerator pedal 45 after recognizing the instruction displayed on the meter panel 44, the motor torque of the traveling motor 13 may be increased, as indicated by an arrow β1 in FIG. 8, to cancel the motor lock state of the traveling motor 13. When the driver depresses the brake pedal 31 after recognizing the instruction displayed on the meter panel 44, the motor torque of the traveling motor 13 may be lowered, as indicated by an arrow β2 in FIG. 8, to cancel the motor lock state of the traveling motor 13.

After the instruction to further depress the accelerator pedal 45 or to perform another driving operation is displayed in order to urge the driver in Step S15, the procedure may proceed to Step S16 as illustrated in FIG. 6. In Step S16, it may be determined whether the traveling motor 13 is in the motor lock state. If it is determined in Step S16 that the traveling motor 13 is in the motor lock state (Step S16: YES), the procedure may proceed to Step S17. In Step S17, it may be determined whether the motor lock state has been maintained for longer than a predetermined period of time Ti2. If it is determined in Step S17 that the motor lock state has been maintained for longer than the predetermined period of time Ti2 (Step S17: YES), the procedure may proceed to Step S18, as illustrated in FIG. 7. In Step S18, the feedback gain may be decreased to a predetermined feedback gain K2, and the carrier frequency may be lowered to a predetermined carrier frequency FL. In contrast, if it is not determined that the traveling motor 13 is in the motor lock state in Step S11 (Step S11: NO) or Step S16 (Step S16: NO), the procedure may exit from the routine without changing the feedback gain and the carrier frequency.

In Step S18, the feedback gain may be decreased to the predetermined feedback gain K2 so that the drive system 12 is actively vibrated by the traveling motor 13 and the torque responsivity of the traveling motor 13 is enhanced. Note that the predetermined feedback gain K2 may be smaller than the default feedback gain K1 and smaller than a predetermined threshold gain to vibrate the drive system 12. As described above, as the feedback gain takes a smaller value, the function of the feedback process for suppressing vibration of the drive system 12 is more weakened. Thus, the damping torque command value Tm2 of the traveling motor 13 may be set to such a value that vibrates the drive system 12. In other words, the drive system 12 may be actively vibrated by setting a small feedback gain. Setting a small feedback gain also enhances the responsivity of the motor torque in preparation for the next accelerator operation.

Figure 9A:
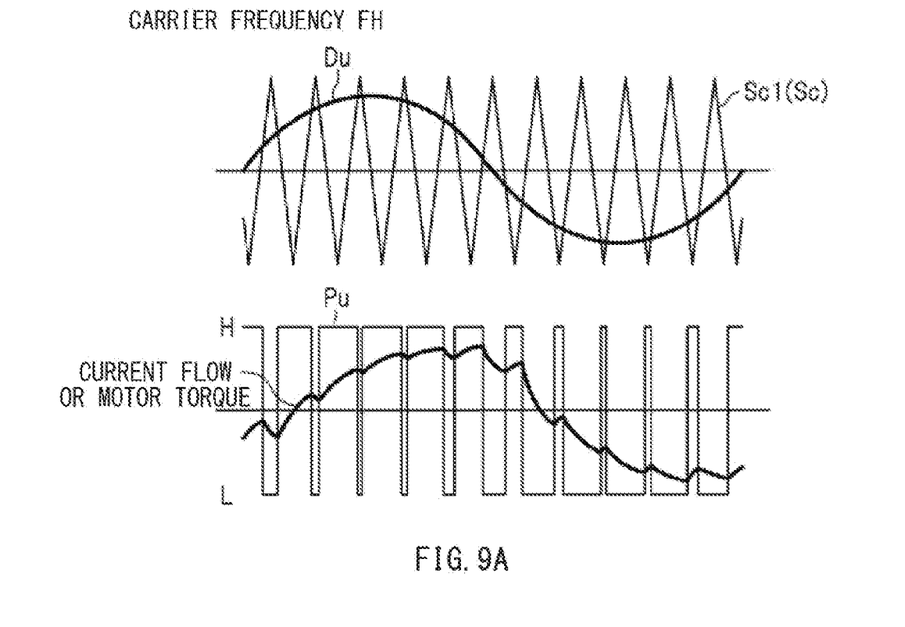
FIG. 9A is a diagram illustrating a change in electric current flow at a carrier frequency.
Figure 9B:
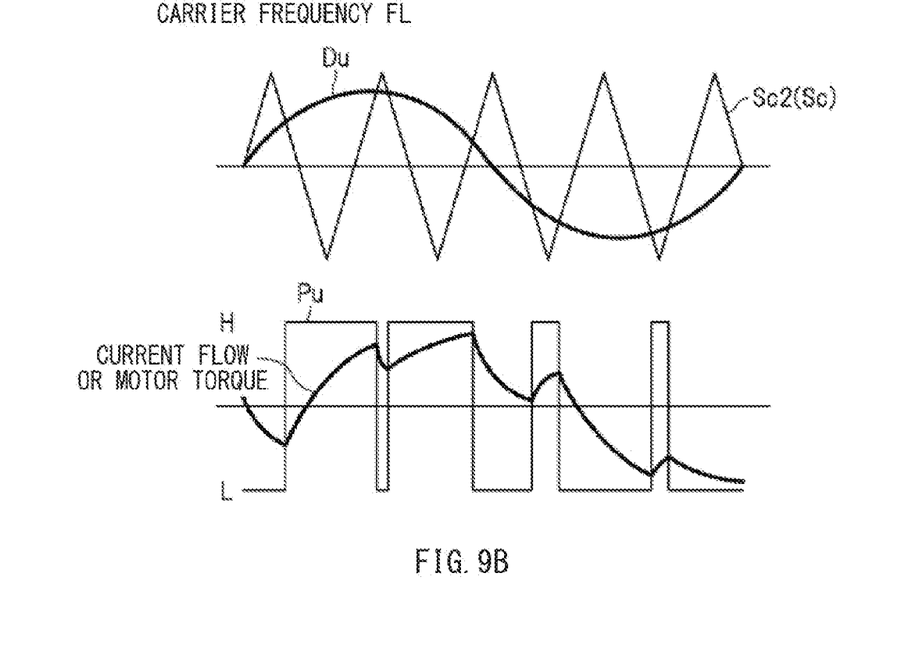
FIG. 9B is a diagram illustrating a change in electric current flow at a carrier frequency.

Additionally, the carrier frequency may be lowered to the predetermined carrier frequency FL in Step S18 so that the drive system 12 is actively vibrated by the traveling motor 13. Note that the predetermined carrier frequency FL used in Step S18 may be lower than the default carrier frequency FH and lower than a predetermined threshold frequency to vibrate the drive system 12. FIGS. 9A and 9B illustrate changes in electric current flows at respective carrier frequencies. FIG. 9A illustrates the transition of an electric current flow when a carrier signal Sc1 having the carrier frequency FH is used. FIG. 9B illustrates the transition of an electric current flow when a carrier signal Sc2 having the carrier frequency FL is used. In FIGS. 9A and 9B, the electric currents flowing in the U-phase field coil Cu of the traveling motor 13 are exemplified. However, the same electric current may flow in the other field coils such as the V-phase field coil Cv and the W-phase field coil Cw.

As illustrated in FIGS. 9A and 9B, a pulse signal Pu may be set to a high level when the carrier signal Sc1 or Sc2 is lower than a command duty ratio Du, while the pulse signal Pu may be set to a low level when the carrier signal Sc1 or Sc2 is higher than the command duty ratio Du. Accordingly, the number of switching of the inverter 20 becomes smaller when the carrier signal Sc2 having a low frequency is used than when the carrier signal Sc1 having a high frequency is used. This causes the electric current flowing in the U-phase field coil Cu to change coarsely. In other words, by lowering the carrier frequency to the predetermined carrier frequency FL, it is possible to set such a pulse signal Pu that increases the torque pulsation or the torque ripple of the traveling motor 13, and to actively vibrate the drive system 12 using the increased torque pulsation. Further, by lowering the carrier frequency to the predetermined carrier frequency FL, it is possible to approximate a switching control sound of the inverter 20 closely to the human audible range.

As described above, the feedback gain may be decreased to the predetermined feedback gain K2, and the carrier frequency may be lowered to the predetermined carrier frequency FL in Step S18 of FIG. 7. This allows the traveling motor 13 to actively vibrate the drive system 12. For example, in a case where the driver performs no accelerator operation for cancelling the motor lock state despite of the fact that the instruction to urge the driver to perform the accelerator operation or another driving operation is displayed on the meter panel 44, the vehicle 11 is actively vibrated by the traveling motor 13. This makes the driver recognize the instruction displayed on the meter panel 44. Additionally, the switching control sound of the inverter 20 is approximated closely to the human audible range by lowering the carrier frequency to the predetermined carrier frequency FL. This makes the driver recognize the instruction displayed on the meter panel 44 with the sound as well as the vibration. The driver is thereby urged to perform the accelerator operation or the brake operation for cancelling the motor lock state, as illustrated by the arrows β1 and β2 in FIG. 8.

When the driver further depresses the accelerator pedal 45 after recognizing the instruction displayed on the meter panel 44, the feedback gain may be increased to the predetermined feedback gain K1, and the carrier frequency may be maintained at the predetermined carrier frequency FL until the motor lock state is cancelled. For example, as described above with reference to FIG. 7, in a case where the feedback gain is decreased to the predetermined feedback gain K2, and where the carrier frequency is lowered to the predetermined carrier frequency FL in Step S18, the procedure may then proceed to Step S19. In Step S19, it may be determined whether the accelerator pedal 45 is further depressed or not, i.e., whether the accelerator operation amount is greater than a predetermined threshold operation amount. In a case where it is determined in Step S19 that the accelerator pedal 45 is further depressed (Step S19: YES) and where it is determined in Step S20 that the accelerator pedal 45 has been depressed for longer than the predetermined period of time Ti2 (Step S20: YES), the procedure may proceed to Step S21. In Step S21, the feedback gain may be increased to the predetermined feedback gain K1, and the carrier frequency may be maintained at the predetermined carrier frequency FL.

In other words, in Step S21, it may be supposed that the driver is depressing the accelerator pedal 45 after recognizing the instruction displayed on the meter panel 44 due to the vibration of the vehicle 11. That is, the purpose of the vibration of the vehicle 11 may be accomplished in Step S21. Thus, the feedback gain may be increased to the predetermined feedback gain K1 to suppress the vibration of the vehicle 11. Additionally, in Step S21, the traveling motor 13 may be maintained in the motor lock state. Thus, the carrier frequency may be maintained at the predetermined low carrier frequency FL to reduce the number of switching and suppress heating of the inverter 20. Note that the predetermined threshold operation amount, which is compared with the accelerator operation amount in Step S19 in order to determine whether the accelerator pedal 45 is further depressed, may be set larger than the accelerator operation amount required to cancel the motor lock state of the traveling motor 13.

Thereafter, in Step S22, it may be determined whether the motor lock state has been cancelled. If it is determined in Step S22 that the motor lock state has been cancelled (Step S22: YES), the procedure may proceed to Step S23. In Step S23, the carrier frequency may be returned to the predetermined carrier frequency FH, and the procedure may exit from the routine. In contrast, if it is not determined in Step S19 that the accelerator pedal 45 is further depressed (Step S19: NO), the procedure may proceed to Step S24. In Step S24, it may be determined whether the brake pedal 31 is depressed or not. In a case where it is determined in Step S24 that the brake pedal 31 is depressed (Step S24: YES) and where it is determined in Step S25 that the motor lock state has been cancelled (Step S25: YES), the procedure may proceed to Step S23. In Step S23, the feedback gain may be returned to the predetermined feedback gain K1, and the carrier frequency may be returned to the predetermined carrier frequency FH. The procedure may then exit from the routine. Note that the predetermined feedback gain K1 set in Step S23 may be larger than a predetermined threshold gain to suppress the vibration of the drive system 12. Additionally, the carrier frequency FH set in Step S23 may be higher than a predetermined threshold frequency to suppress the vibration of the drive system 12 and heating of the inverter 20.

Conclusion

As described above, when it is determined that the traveling motor 13 is in the motor lock state, the feedback gain is set smaller than the predetermined threshold gain, and the carrier frequency is set lower than the predetermined threshold frequency. This causes the traveling motor 13 to actively vibrate the drive system 12, making the driver feel strange and urging the driver to perform the driving operation for cancelling the motor lock state. Further, by setting the carrier frequency lower than the predetermined threshold frequency, it is possible to approximate the switching control sound of the inverter 20 closely to the human audible range. This makes the driver feel strange and urges the driver to perform the driving operation for cancelling the motor lock state. Accordingly, it is possible to make the driver perform the accelerator operation or the brake operation for cancelling the motor lock state of the traveling motor 13.

In the above description, the driver may perform the accelerator operation or the brake operation after recognizing the generation of the motor lock state due to the vibration of the drive system 12; however, there may be some situations where the driver does not perform the accelerator operation nor another driving operation. In such situations, the damping torque command value Tm2 may be actively decreased by the command value correction unit 53 of the motor controller 50 to protect the traveling motor 13 from being excessively heated. Such a decrease in the damping torque command value Tm2 can cause the vehicle 11 to move backward against the intention of the driver. To address such a concern, the electric hydraulic brake system 30 may be controlled by the brake control unit 42 of the main controller 40, and the electric hydraulic brake system 30 may apply the brakes to the wheels 18. As described above, the motor controller 50 has a protection function that protects the traveling motor 13 in the motor lock state from being heated.

Further, as described above, the motor controller 50 includes the command value correction unit 53 and the inverter control unit 54. The command value correction unit 53 and the inverter control unit 54 set the feedback gain to be smaller than the predetermined threshold gain and the carrier frequency to be lower than the predetermined threshold frequency when the traveling motor 13 is in the motor lock state. In other words, the motor controller 50 has a notification function to notify the driver of the motor lock state by vibrating the drive system 12. By providing the protection function and the notification function to the single motor controller 50 as described above, the execution timing of the protection function is delayed until just before the traveling motor 13 is protected from being excessively heated. This reduces the time in which the motor torque is limited and thus secures driving performance. In contrast, if the protection function and the notification function to be executed prior to the protection function are installed in separate controllers, it is necessary to set the execution timing of the protection function with a time margin because it is necessary to consider the communication delay between controllers. On the other hand, according to the present embodiment in which the protection function and the notification function are installed in a single controller, the execution timing of the protection function is delayed until just before the traveling motor 13 is protected from being excessively heated. This reduces the time in which the motor torque is limited and thus secures driving performance.

The example embodiments described above may be non-limiting examples and may be modified in various ways without departing from the gist of the technology. In the example embodiments described above, the vehicle 11 to which the vehicle control apparatus 10 is applied may be an electric vehicle including the traveling motor 13 as a sole power source. However, this is a non-limiting example. Alternatively, the vehicle 11 may be a hybrid vehicle including both a traveling motor and an engine as power sources. Further, in the example embodiments described above, the main controller 40 includes the target torque setting unit 41, and the motor controller 50 includes the command value correction unit 53, the inverter control unit 54, and the motor lock determination unit 67. However, this is a non-limiting example. For example, the target torque setting unit 41, the command value correction unit 53, the inverter control unit 54, and the motor lock determination unit 67 may be included in a single controller or a plurality of controllers.

Figure 10:
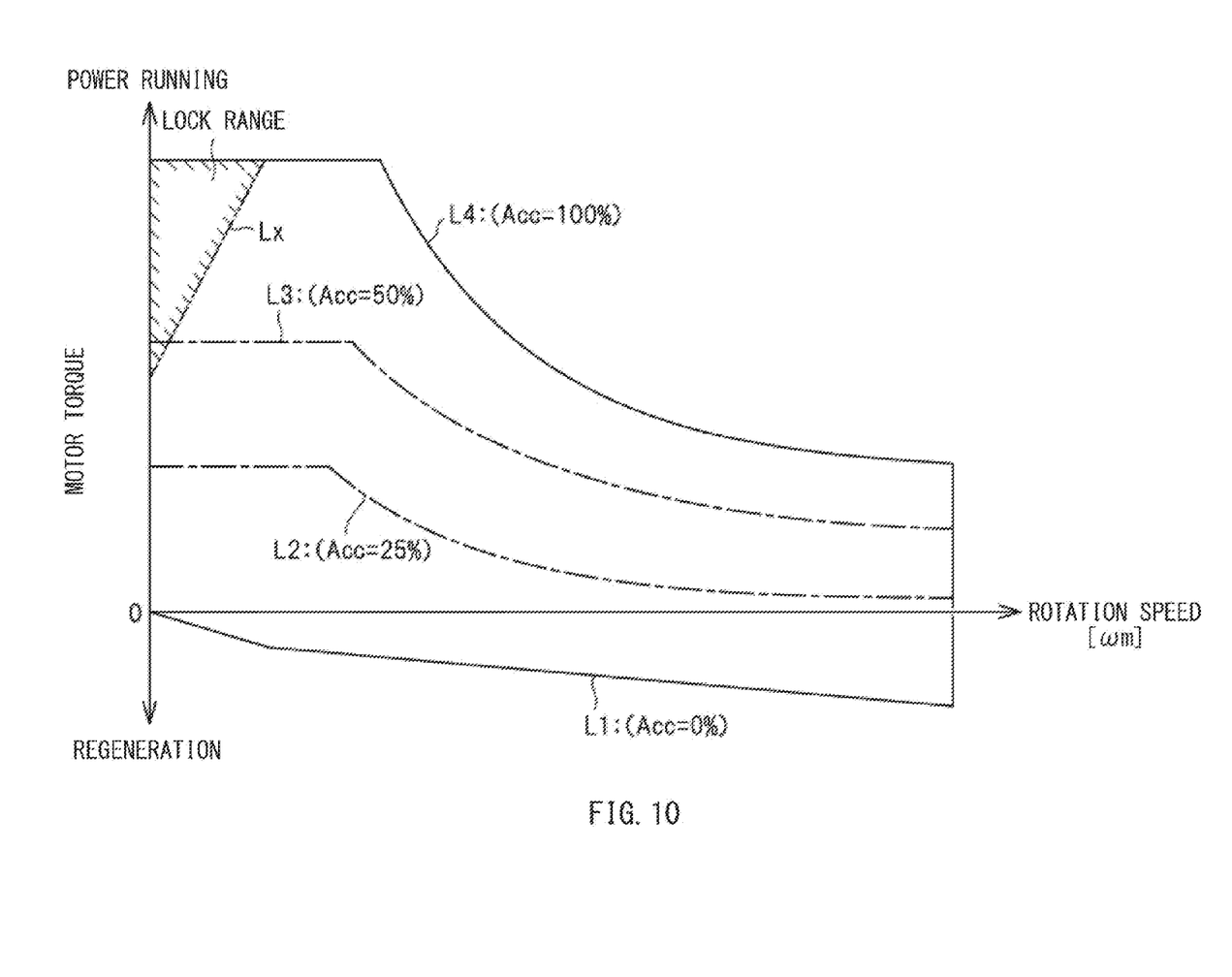
FIG. 10 is a diagram illustrating another example of the lock range.

In the example illustrated in FIG. 5, the lock range may be a range in which the traveling motor 13 has a rotation speed lower than the predetermined threshold rotation speed Sb and a motor torque greater than the predetermined threshold torque Tb. However, this is a non-limiting example. Alternatively, the threshold rotation speed Sb compared with the rotation speed of the traveling motor 13 may be changed depending on the motor torque. Still alternatively, the threshold torque Tb compared with the motor torque of the traveling motor 13 may be changed depending on the rotation speed. FIG. 10 illustrates another example of the lock range. As illustrated in FIG. 10, a characteristic line (threshold) Lx may be set on the basis of the motor torque and the rotation speed, and the range in which the motor torque is higher than the characteristic line Lx and the rotation speed is lower than the characteristic line Lx may be set as the lock range. Note that the characteristic line Lx is not necessarily a straight line, and may be alternatively a curved line.

In the above description, the feedback gain K1 or K2 and the carrier frequency FH or FL may be used. However, this is a non-limiting example. Alternatively, the feedback gain or the carrier frequency may be changed depending on the rotation speed or the motor torque of the traveling motor 13.

Further, in the flowchart described above, the feedback gain is set to be smaller and the carrier frequency is set to be lower in a case where the traveling motor 13 is in the motor lock state and where the road surface has an upward gradient. However, this is a non-limiting example. Alternatively, the feedback gain may be set to be smaller and the carrier frequency may be set to be lower in a case where the vehicle 11 is determined to be traveling on a flat road and where the traveling motor 13 is determined to be in the motor lock state.

According to the example embodiment of the technology, when the traveling motor is determined to be in the motor lock state, the torque correction unit sets the feedback gain, which is used to correct the first torque command value to the second torque command value, to be smaller than the threshold gain, and the inverter control unit sets the frequency of the carrier signal to be lower than the threshold frequency. Accordingly, it is possible to urge the driver to perform the accelerator operation or another driving operation by vibrating the drive system when the traveling motor is in the motor lock state.

At least one of the target torque setting unit 41, the command value correction unit 53, the inverter control unit 54, or the motor lock determination unit 67 illustrated in FIGS. 1 and 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the target torque setting unit 41, the command value correction unit 53, the inverter control unit 54, and the motor lock determination unit 67. Such a medium may take many forms, including, but not limited to, any type of magnetic medium such as a hard disk, any type of optical medium such as a CD and a DVD, any type of semiconductor memory (i.e., semiconductor circuit) such as a volatile memory and a nonvolatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the target torque setting unit 41, the command value correction unit 53, the inverter control unit 54, and the motor lock determination unit 67 illustrated in FIGS. 1 and 3.

The invention claimed is:

1. A vehicle control apparatus to be applied to a vehicle, the vehicle control apparatus being configured to perform control of a traveling motor of the vehicle, the traveling motor serving as a power source of a drive system of the vehicle, the apparatus comprising:
   an inverter including a plurality of switching elements, the inverter being configured to supply electric power to the traveling motor through the switching elements;
   a torque setting unit configured to set a first torque command value of the traveling motor on a basis of an operation amount of an accelerator of the vehicle;
   a torque correction unit configured to correct the first torque command value to a second torque command value by performing feedback of a result of the control of the traveling motor to the first torque command value, the second torque command value being to be used to suppress vibration of the drive system, an inverter control unit configured to generate a drive signal for the switching elements on a basis of the second torque command value and a carrier signal; and a motor lock determination unit configured to determine whether the traveling motor is in a motor lock state in which the traveling motor operates within a lock range, wherein, in a case where the traveling motor is determined to be in the motor lock state, the torque correction unit is configured to set a feedback gain to be smaller than a threshold gain at time of correcting the first torque command value to the second torque command value, and in the case where the traveling motor is determined to be in the motor lock state, the inverter control unit is configured to set a frequency of the carrier signal to be lower than a threshold frequency at time of generating the drive signal.

2. The vehicle control apparatus according to claim 1, wherein the lock range indicates a range in which a rotation speed of the traveling motor is lower than a threshold rotation speed, and a torque of the traveling motor is greater than a threshold torque.

3. The vehicle control apparatus according to claim 1, wherein the torque correction unit is configured to set the feedback gain to be smaller than the threshold gain in a case where the traveling motor is determined to be in the motor lock state and where a road surface on which the vehicle travels is determined to have an upward gradient, and the inverter control unit is configured to set the frequency of the carrier signal to be lower than the threshold frequency in the case where the traveling motor is determined to be in the motor lock state and where the road surface is determined to have the upward gradient.

4. The vehicle control apparatus according to claim 2, wherein the torque correction unit is configured to set the feedback gain to be smaller than the threshold gain in a case where the traveling motor is determined to be in the motor lock state and where a road surface on which the vehicle travels is determined to have an upward gradient, and the inverter control unit is configured to set the frequency of the carrier signal to be lower than the threshold frequency in the case where the traveling motor is determined to be in the motor lock state and where the road surface is determined to have the upward gradient.

5. The vehicle control apparatus according to claim 1, wherein the torque correction unit is configured to, after the traveling motor is determined to be in the motor lock state and the feedback gain is set to be smaller than the threshold gain, set the feedback gain to be larger than the threshold gain in a case where the traveling motor is determined to be in the motor lock state and where the operation amount of the accelerator is determined to be greater than a threshold operation amount, or in a case where the traveling motor is not determined to be in the motor lock state.

6. The vehicle control apparatus according to claim 2, wherein the torque correction unit is configured to, after the traveling motor is determined to be in the motor lock state and the feedback gain is set to be smaller than the threshold gain, set the feedback gain to be larger than the threshold gain in a case where the traveling motor is determined to be in the motor lock state and where the operation amount of the accelerator is determined to be greater than a threshold operation amount, or in a case where the traveling motor is not determined to be in the motor lock state.

7. The vehicle control apparatus according to claim 3, wherein the torque correction unit is configured to, after the traveling motor is determined to be in the motor lock state and the feedback gain is set to be smaller than the threshold gain, set the feedback gain to be larger than the threshold gain in a case where the traveling motor is determined to be in the motor lock state and where the operation amount of the accelerator is determined to be greater than a threshold operation amount, or in a case where the traveling motor is not determined to be in the motor lock state.

8. The vehicle control apparatus according to claim 4, wherein the torque correction unit is configured to, after the traveling motor is determined to be in the motor lock state and the feedback gain is set to be smaller than the threshold gain, set the feedback gain to be larger than the threshold gain in a case where the traveling motor is determined to be in the motor lock state and where the operation amount of the accelerator is determined to be greater than a threshold operation amount, or in a case where the traveling motor is not determined to be in the motor lock state.

9. The vehicle control apparatus according to claim 1, wherein the inverter control unit is configured to, after the traveling motor is determined to be in the motor lock state and the frequency of the carrier signal is set to be lower than the threshold frequency, set the frequency of the carrier signal to be higher than the threshold frequency in a case where the traveling motor is not determined to be in the motor lock state.

10. The vehicle control apparatus according to claim 2, wherein the inverter control unit is configured to, after the traveling motor is determined to be in the motor lock state and the frequency of the carrier signal is set to be lower than the threshold frequency, set the frequency of the carrier signal to be higher than the threshold frequency in a case where the traveling motor is not determined to be in the motor lock state.

11. The vehicle control apparatus according to claim 3, wherein the inverter control unit is configured to, after the traveling motor is determined to be in the motor lock state and the frequency of the carrier signal is set to be lower than the threshold frequency, set the frequency of the carrier signal to be higher than the threshold frequency in a case where the traveling motor is not determined to be in the motor lock state.

12. The vehicle control apparatus according to claim 4, wherein the inverter control unit is configured to, after the traveling motor is determined to be in the motor lock state and the frequency of the carrier signal is set to be lower than the threshold frequency, set the frequency of the carrier signal to be higher than the threshold frequency in a case where the traveling motor is not determined to be in the motor lock state.

13. The vehicle control apparatus according to claim 5, wherein the inverter control unit is configured to, after the traveling motor is determined to be in the motor lock state and the frequency of the carrier signal is set to be lower than the threshold frequency, set the frequency of the carrier signal to be higher than the threshold frequency in a case where the traveling motor is not determined to be in the motor lock state.

14. The vehicle control apparatus according to claim 6, wherein the inverter control unit is configured to, after the traveling motor is determined to be in the motor lock state and the frequency of the carrier signal is set to be lower than the threshold frequency, set the frequency of the carrier signal to be higher than the threshold frequency in a case where the traveling motor is not determined to be in the motor lock state.

15. The vehicle control apparatus according to claim 7, wherein the inverter control unit is configured to, after the traveling motor is determined to be in the motor lock state and the frequency of the carrier signal is set to be lower than the threshold frequency, set the frequency of the carrier signal to be higher than the threshold frequency in a case where the traveling motor is not determined to be in the motor lock state.

16. The vehicle control apparatus according to claim 8, wherein the inverter control unit is configured to, after the traveling motor is determined to be in the motor lock state and the frequency of the carrier signal is set to be lower than the threshold frequency, set the frequency of the carrier signal to be higher than the threshold frequency in a case where the traveling motor is not determined to be in the motor lock state.

17. A vehicle control apparatus to be applied to a vehicle, the vehicle control apparatus being configured to perform control of a traveling motor of the vehicle, the traveling motor serving as a power source of a drive system of the vehicle, the apparatus comprising:
  an inverter including a plurality of switching elements, the inverter being configured to supply electric power to the traveling motor through the switching elements; and
  circuitry configured to
  set a first torque command value of the traveling motor on a basis of an operation amount of an accelerator of the vehicle,
  correct the first torque command value to a second torque command value by performing feedback of a result of the control of the traveling motor to the first torque command value, the second torque command value being to be used to suppress vibration of the drive system,
  generate a drive signal for the switching elements on a basis of the second torque command value and a carrier signal, and
  determine whether the traveling motor is in a motor lock state in which the traveling motor operates within a lock range, wherein
  the circuitry is configured to,
  upon determining that the traveling motor is in the motor lock state, set a feedback gain to be smaller than a threshold gain at time of correcting the first torque command value to the second torque command value, and
  upon determining that the traveling motor is in the motor lock state, set a frequency of the carrier signal to be lower than a threshold frequency at time of generating the drive signal.

* * * * *